(12) United States Patent
An et al.

(10) Patent No.: US 12,264,240 B2
(45) Date of Patent: Apr. 1, 2025

(54) THERMOPLASTIC RESIN COMPOSITION, METHOD OF PREPARING THE SAME, AND MOLDED ARTICLE INCLUDING THE SAME

(71) Applicant: LG CHEM, LTD., Seoul (KR)

(72) Inventors: Yong Hee An, Daejeon (KR); Tae Hoon Kim, Daejeon (KR); Chun Ho Park, Daejeon (KR); Daeun Sung, Daejeon (KR); Wangrae Joe, Daejeon (KR); Jeongmin Jang, Daejeon (KR)

(73) Assignee: LG CHEM, LTD, Seoul (KR)

( * ) Notice: Subject to any disclaimer, the term of this patent is extended or adjusted under 35 U.S.C. 154(b) by 683 days.

(21) Appl. No.: 17/620,409

(22) PCT Filed: Jun. 3, 2021

(86) PCT No.: PCT/KR2021/006917
§ 371 (c)(1),
(2) Date: Dec. 17, 2021

(87) PCT Pub. No.: WO2022/019471
PCT Pub. Date: Jan. 27, 2022

(65) Prior Publication Data
US 2022/0348759 A1    Nov. 3, 2022

(30) Foreign Application Priority Data

Jul. 21, 2020 (KR) .................. 10-2020-0090490
May 28, 2021 (KR) .................. 10-2021-0069027

(51) Int. Cl.
| | | |
|---|---|---|
| C08L 51/00 | (2006.01) | |
| B29C 48/00 | (2019.01) | |
| B29K 25/00 | (2006.01) | |
| B29K 33/00 | (2006.01) | |
| C08L 25/12 | (2006.01) | |
| C08L 25/16 | (2006.01) | |
| C08L 33/12 | (2006.01) | |
| C08L 51/04 | (2006.01) | |

(52) U.S. Cl.
CPC .......... C08L 51/003 (2013.01); B29C 48/022 (2019.02); C08L 25/12 (2013.01); C08L 25/16 (2013.01); C08L 33/12 (2013.01); *B29K 2025/08* (2013.01); *B29K 2033/12* (2013.01); *C08L 2205/025* (2013.01); *C08L 2205/035* (2013.01); *C08L 2205/18* (2013.01)

(58) Field of Classification Search
CPC .... C08L 51/003; C08L 25/12; B29K 2025/08
See application file for complete search history.

(56) References Cited

U.S. PATENT DOCUMENTS

| | | | |
|---|---|---|---|
| 2006/0194926 A1 | 8/2006 | Lee et al. | |
| 2010/0004394 A1 | 1/2010 | Higaki et al. | |
| 2010/0024735 A1* | 2/2010 | Park et al. | |
| 2010/0048798 A1 | 2/2010 | You et al. | |
| 2012/0172502 A1* | 7/2012 | Lee .................. C08L 55/02 |
| | | | 524/114 |
| 2013/0023618 A1 | 1/2013 | Miyake et al. | |
| 2017/0121519 A1 | 5/2017 | Park et al. | |
| 2019/0023892 A1 | 1/2019 | Kang et al. | |
| 2019/0382574 A1* | 12/2019 | An .................. C08L 33/062 |
| 2020/0165439 A1 | 5/2020 | An et al. | |
| 2021/0024735 A1 | 1/2021 | Park et al. | |
| 2021/0206958 A1 | 7/2021 | Park et al. | |
| 2021/0230333 A1 | 7/2021 | Jo et al. | |
| 2021/0238404 A1 | 8/2021 | Sung et al. | |
| 2021/0261740 A1 | 8/2021 | Schulz et al. | |

FOREIGN PATENT DOCUMENTS

| | | |
|---|---|---|
| CN | 101665606 A | 3/2010 |
| CN | 109071912 A | 12/2018 |
| EP | 3 778 758 A1 | 2/2021 |
| KR | 10-2005-0024038 A | 3/2005 |
| KR | 10-0781963 B1 | 12/2007 |
| KR | 10-2011-0079487 A | 7/2011 |
| KR | 10-1444054 A | 4/2014 |

(Continued)

OTHER PUBLICATIONS

English Machine Translation of KR20170142763A ; Lee et al. (Year: 2017).*
"Extensional Flow Properties of Polymers using Stretching Flow Methods" Rides et al.; National Physical Laboratory (Year: 2001).*
"Overview of Materials for Acrylonitrile/Styrene/Acrylate (ASA), Unreinforced, Molded" Matweb; Accessed Sep. 10, 2024; <https://www.matweb.com/search/datasheet.aspx?matguid=24c5655bc30e42c3949df6c53122bd61> (Year: 2018).*
"Injection Molding Cooling Time: A Breakdown" Jerremy Williams; RJG; Accessed Sep. 10, 2024; <https://www.designworldonline.com/injection-molding-cooling-time-a-breakdown/> (Year: 2017).*
First Office Action dated Aug. 16, 2023 from the CNIPA corresponding Chinese Patent Application No. 202180004484.5.

(Continued)

*Primary Examiner* — Brieann R Johnston
*Assistant Examiner* — Holley Grace Hester
(74) *Attorney, Agent, or Firm* — Morgan, Lewis & Bockius LLP

(57) ABSTRACT

A thermoplastic resin composition including 100 parts by weight of a base resin including 0.5 to 45% by weight of a graft copolymer (A-1) including acrylate rubber having an average particle diameter of 50 to 150 nm, an aromatic vinyl compound, and a vinyl cyanide compound, 20 to 80% by weight of a graft copolymer (A-2) including acrylate rubber having an average particle diameter of 151 to 600 nm, an aromatic vinyl compound, and a vinyl cyanide compound, and 10 to 45% by weight of an α-methylstyrene-based copolymer (B) having a weight average molecular weight of 60,000 to 180,000 g/mol; and 0.5 to 10 parts by weight of an ultra-high molecular weight copolymer (C) having a weight average molecular weight of 1,000,000 to 12,000,000 g/mol. A method of preparing the thermoplastic resin composition and a molded article including the thermoplastic resin composition are also disclosed.

15 Claims, No Drawings

(56) References Cited

FOREIGN PATENT DOCUMENTS

| KR | 10-2014-0096748 | A |   | 8/2014 |
|----|-----------------|---|---|--------|
| KR | 10-2015-0114239 | A |   | 10/2015 |
| KR | 20170142763     | A | * | 12/2017 |
| KR | 10-2018-0050595 | A |   | 5/2018 |
| KR | 10-2018-0050596 | A |   | 5/2018 |
| KR | 10-1974164      | B1 |  | 4/2019 |
| KR | 10-2019-0114898 | A |   | 10/2019 |
| KR | 20190114898     | A | * | 10/2019 |
| KR | 10-2020-0049604 | A1 |  | 5/2020 |
| KR | 10-2020-0049623 | A |   | 5/2020 |
| KR | 10-2020-0078040 | A |   | 7/2020 |
| WO | 2019/190298     | A1 |  | 10/2019 |
| WO | 2019/243105     | A1 |  | 12/2019 |

OTHER PUBLICATIONS

Extended European Search Report issued in corresponding European Patent Application No. 21 819 312.6, dated Sep. 28, 2022.
International Search Report and Written Opinion issued in corresponding International Patent Application No. PCT/KR2021/006917, dated Jun. 3, 2021.
First Office Action issued in corresponding Japanese Patent Application No. 2022-511090, dated Feb. 27, 2023.

* cited by examiner

THERMOPLASTIC RESIN COMPOSITION, METHOD OF PREPARING THE SAME, AND MOLDED ARTICLE INCLUDING THE SAME

TECHNICAL FIELD

Cross-Reference to Related Applications

This application claims priority to Korean Patent Application No. 10-2020-0090490, filed on Jul. 21, 2020, and Korean Patent Application No. 10-2021-0069027, re-filed on May 28, 2021, based on the priority of the above patent, in the Korean Intellectual Property Office, the disclosures of each of which are incorporated herein by reference.

The present invention relates to a thermoplastic resin composition, a method of preparing the same, and a molded article including the same. More particularly, the present invention relates to a thermoplastic resin composition that has excellent mechanical properties such as impact strength, tensile strength, and flexural strength and is capable of replacing a PVC resin by allowing use of existing equipment due to excellent processability and heat resistance thereof; a method of preparing the thermoplastic resin composition; and a molded article including the thermoplastic resin composition.

BACKGROUND ART

A polyvinylchloride resin (hereinafter referred to as "PVC resin") is a general-purpose resin that is inexpensive and has excellent flame retardancy, chemical resistance, and processability. In addition to these advantages, when a polyvinylchloride resin is used, it is easy to control the hardness of a product. Accordingly, polyvinylchloride resins are generally applied to exterior materials for construction, especially window frames.

However, due to the intrinsic nature of PVC resins, reprocessing of PVC resins is difficult, and harmful substances are generated when PVC resins are prepared or discarded. In addition, compared to other resins, PVC resins are vulnerable to thermal deformation due to low heat resistance thereof. Due to these limitations, when manufacturing an outdoor window frame using a PVC resin, the window frame is mainly manufactured in white.

Recently, as demand for new building materials and building materials having a luxurious appearance increases, demand for colored window frames is increasing. Accordingly, to impart a color to a window frame manufactured using a PVC resin, a method of painting the window frame or attaching a film to the window frame is used. However, problems such as scratches or discoloration occur.

Acrylonitrile-styrene-acrylate copolymers (hereinafter referred to as "ASA resins") have excellent weather resistance, light resistance, chemical resistance, heat resistance, and impact resistance, and thus are widely used in various fields, such as electric/electronic parts, building materials, automobiles, ships, and leisure goods, due to broad applicability thereof.

An ASA resin is attracting attention as a resin that can be used instead of a PVC resin. However, ASA resins have poor processability due to high flowability thereof, and additional costs are incurred due to replacement of an existing extruder for PVC resins. That is, when the type of a resin is changed, the shape of an extruder must also be changed.

Therefore, there is growing demand for development of an ASA resin composition that can be prepared using existing equipment for PVC resins due to excellent processability thereof and is resistant to deformation caused by outdoor radiant heat.

RELATED ART DOCUMENTS

Patent Documents

KR 10-1444054 B1

DISCLOSURE

Technical Problem

Therefore, the present invention has been made in view of the above problems, and it is one object of the present invention to provide a thermoplastic resin composition that has excellent mechanical properties such as impact strength, tensile strength, and flexural strength and is capable of replacing a PVC resin by allowing use of an existing extruder due to excellent processability and heat resistance thereof; a method of preparing the thermoplastic resin composition; and a molded article including the thermoplastic resin composition.

The above and other objects can be accomplished by the present invention described below.

Technical Solution

In accordance with one aspect of the present invention, provided is a thermoplastic resin composition including 100 parts by weight of a base resin including 0.5 to 45% by weight of a graft copolymer (A-1) including acrylate rubber having an average particle diameter of 50 to 150 nm, an aromatic vinyl compound, and a vinyl cyanide compound, 20 to 80% by weight of a graft copolymer (A-2) including acrylate rubber having an average particle diameter of 151 to 600 nm, an aromatic vinyl compound, and a vinyl cyanide compound, and 10 to 45% by weight of an α-methylstyrene-based copolymer (B) having a weight average molecular weight of 60,000 to 180,000 g/mol; and 0.5 to 10 parts by weight of an ultra-high molecular weight copolymer (C) having a weight average molecular weight of 1,000,000 to 12,000,000 g/mol.

In accordance with another aspect of the present invention, provided is a method of preparing a thermoplastic resin composition, the method including mixing 100 parts by weight of a base resin including 0.5 to 45% by weight of a graft copolymer (A-1) including acrylate rubber having an average particle diameter of 50 to 150 nm, an aromatic vinyl compound, and a vinyl cyanide compound, 20 to 80% by weight of a graft copolymer (A-2) including acrylate rubber having an average particle diameter of 151 to 600 nm, an aromatic vinyl compound, and a vinyl cyanide compound, and 10 to 45% by weight of an α-methylstyrene-based copolymer (B) having a weight average molecular weight of 60,000 to 180,000 g/mol; and 0.5 to 10 parts by weight of an ultra-high molecular weight copolymer (C) having a weight average molecular weight of 1,000,000 to 12,000,000 g/mol, and then preparing pellets using an extrusion kneader with a size of 10 to 100 pi at 200 to 300° C.

In accordance with yet another aspect of the present invention, provided is a molded article including the thermoplastic resin composition.

Advantageous Effects

The present invention can provide a high-quality thermoplastic resin composition with improved heat resistance and extensional viscosity and low flowability while maintaining mechanical properties such as impact strength, tensile strength, and flexural strength; a method of preparing the thermoplastic resin composition; and a molded article including the thermoplastic resin composition. According to the present invention, the thermoplastic resin composition can be applied to fields, such as exterior materials for construction, that require processability and resistance against deformation caused by outdoor radiant heat.

In particular, the thermoplastic resin composition can replace a PVC resin and allows use of an existing extruder, thereby improving economics.

BEST MODE

Hereinafter, a thermoplastic resin composition, a method of preparing the same, and a molded article including the same according to the present invention will be described in detail.

The present inventors confirmed that, when a thermoplastic resin composition was prepared by adding an ultra-high molecular weight copolymer in a predetermined content ratio to a base resin including two types of acrylate-based rubber-aromatic vinyl compound-vinyl cyanide compound graft copolymers each containing acrylate rubber particles having different average particle diameters and an α-methylstyrene-vinyl cyanide copolymer, the prepared thermoplastic resin composition had excellent mechanical properties, was capable of replacing a PVC resin due to excellent heat resistance and processability thereof, and was producible using an existing extruder. Based on these results, the present inventors conducted further studies to complete the present invention.

The thermoplastic resin composition of the present invention will be described as follows.

The thermoplastic resin composition of the present invention includes 100 parts by weight of a base resin including 0.5 to 45% by weight of a graft copolymer (A-1) including acrylate rubber having an average particle diameter of 50 to 150 nm, an aromatic vinyl compound, and a vinyl cyanide compound, 20 to 80% by weight of a graft copolymer (A-2) including acrylate rubber having an average particle diameter of 151 to 600 nm, an aromatic vinyl compound, and a vinyl cyanide compound, and 10 to 45% by weight of an α-methylstyrene-based copolymer (B) having a weight average molecular weight of 60,000 to 180,000 g/mol; and 0.5 to 10 parts by weight of an ultra-high molecular weight copolymer (C) having a weight average molecular weight of 1,000,000 to 12,000,000 g/mol. In this case, since the thermoplastic resin composition of the present invention has excellent heat resistance and processability while having excellent mechanical properties such as impact strength, tensile strength, flexural strength, and hardness, the thermoplastic resin composition may replace a PVC resin using an existing extruder.

Hereinafter, each component constituting the thermoplastic resin composition of the present invention will be described in detail.

A-1) Graft Copolymer Including Acrylate Rubber, Aromatic Vinyl Compound, and Vinyl Cyanide Compound For example, the acrylate rubber of the graft copolymer (A-1) may have an average particle diameter of 50 to 150 nm, preferably 60 to 140 nm, more preferably 70 to 140 nm, still more preferably 80 to 140 nm. Within this range, in addition to excellent impact strength, tensile strength, flexural strength, and hardness, a finally prepared thermoplastic resin composition may have excellent processability.

In this specification, average particle diameter may be measured by dynamic light scattering, and specifically, may be measured as an intensity value using a Nicomp 380 particle size analyzer (manufacturer: PSS) in a Gaussian mode. As a specific measurement example, a sample is prepared by diluting 0.1 g of latex (TSC: 35 to 50 wt %) 1,000 to 5,000 times with distilled water, i.e., a sample is diluted appropriately so as not to deviate significantly from an intensity setpoint of 300 kHz and is placed in a glass tube. Then, the average particle diameter of the sample is measured using a flow cell in auto-dilution in a measurement mode of dynamic light scattering/intensity 300 kHz/intensity-weight Gaussian analysis. At this time, setting values are as follows: temperature: 23° C.; measurement wavelength: 632.8 nm; and channel width: 10 psec.

For example, based on a total weight of the base resin, the graft copolymer (A-1) may be included in an amount of 0.5 to 45% by weight, preferably 1 to 35% by weight, more preferably 10 to 25% by weight. Within this range, balance between mechanical strength and extensional viscosity may be excellent.

For example, the graft copolymer (A-1) may include 40 to 60% by weight of acrylate rubber, 25 to 45% by weight of an aromatic vinyl compound, and 5 to 25% by weight of a vinyl cyanide compound. Within this range, impact strength, tensile strength, flexural strength, and extensional viscosity may be excellent.

As a preferred example, the graft copolymer (A-1) may include 45 to 55% by weight of acrylate rubber, 30 to 40% by weight of an aromatic vinyl compound, and 10 to 20% by weight of a vinyl cyanide compound. Within this range, impact strength, tensile strength, flexural strength, and extensional viscosity may be excellent.

In this description, a polymer including a certain compound means a polymer prepared by polymerizing the compound, and a unit in the polymer is derived from the compound.

For example, the graft copolymer (A-1) may be prepared by emulsion polymerization. In this case, mechanical strength such as tensile strength, impact strength, and flexural strength may be excellent.

Emulsion graft polymerization methods commonly practiced in the art to which the present invention pertains may be used as the emulsion polymerization method of the present invention without particular limitation.

In this description, for example, the acrylate may include one or more selected from the group consisting of alkyl acrylates containing an alkyl group having 2 to 8 carbon atoms, and is preferably an alkyl acrylate containing an alkyl group having 4 to 8 carbon atoms, more preferably butyl acrylate or ethylhexyl acrylate.

In this description, for example, the aromatic vinyl compound may include one or more selected from the group consisting of styrene, α-methylstyrene, m-methylstyrene, p-methylstyrene, and p-tert-butylstyrene, and is preferably styrene.

In this description, for example, the vinyl cyanide compound may include one or more selected from the group consisting of acrylonitrile, methacrylonitrile, ethylacrylonitrile, and isopropylacrylonitrile, and is preferably acrylonitrile.

A-2) Graft Copolymer Including Acrylate Rubber, Aromatic Vinyl Compound, and Vinyl Cyanide Compound For example, the acrylate rubber of the graft copolymer (A-2) may have an average particle diameter of 151 to 600 nm, preferably 200 to 500 nm, more preferably 300 to 450 nm, still more preferably 350 to 430 nm. Within this range, in addition to excellent impact strength, tensile strength, flexural strength, and hardness, a finally prepared thermoplastic resin composition may have excellent processability.

For example, based on a total weight of the base resin, the graft copolymer (A-2) may be included in an amount of 20 to 80% by weight, preferably 30 to 75% by weight, more preferably 40 to 70% by weight. Within this range, balance between mechanical strength and extensional viscosity may be excellent.

For example, the graft copolymer (A-2) may include 40 to 60% by weight of acrylate rubber, 25 to 45% by weight of an aromatic vinyl compound, and 5 to 25% by weight of a vinyl cyanide compound. Within this range, impact strength, tensile strength, flexural strength, and extensional viscosity may be excellent.

As a preferred example, the graft copolymer (A-2) may include 45 to 55% by weight of acrylate rubber, 30 to 40% by weight of an aromatic vinyl compound, and 10 to 20% by weight of a vinyl cyanide compound. Within this range, impact strength, tensile strength, flexural strength, and extensional viscosity may be excellent.

For example, the graft copolymer (A-2) may be prepared by emulsion polymerization. In this case, mechanical strength such as tensile strength, impact strength, and flexural strength may be excellent.

Emulsion graft polymerization methods commonly practiced in the art to which the present invention pertains may be used as the emulsion polymerization method of the present invention without particular limitation.

The amount of the graft copolymer (A-1) is preferably less than that of the graft copolymer (A-2). More preferably, the weight ratio of the graft copolymer (A-1) to the graft copolymer (A-2) is 1:3 to 1:5, still more preferably 1:3.3 to 1:4.7. Within this range, balance between mechanical properties and extensional viscosity may be excellent.

In this specification, the weight ratio of A to B refers to the weight ratio of A:B.

The types of the acrylate, the aromatic vinyl compound, and the vinyl cyanide compound included in the graft copolymer (A-2) may be the same as the types of the acrylate, the aromatic vinyl compound, and the vinyl cyanide compound included in the graft copolymer (A-1).

B) α-Methylstyrene-Based Copolymer

For example, based on a total weight of the base resin, the α-methylstyrene-based copolymer (B) may be included in an amount of 10 to 45% by weight, preferably 15 to 40% by weight, more preferably 20 to 35% by weight. Within this range, since the thermoplastic resin composition of the present invention has excellent heat resistance and processability while having excellent mechanical properties such as impact strength, tensile strength, flexural strength, and hardness, the thermoplastic resin composition may replace a PVC resin using an existing extruder.

The α-methylstyrene-based polymer (B) may be a heat-resistant copolymer. In this case, a finally prepared thermoplastic resin composition may have heat resistance while maintaining mechanical properties.

Polymers commonly referred to as heat-resistant resins in the art to which the present invention pertains may be used as the heat-resistant copolymer of the present invention without particular limitation. Specifically, the heat-resistant copolymer may refer to a monomer having a higher glass transition temperature (based on polymer) than a styrene monomer, that is, a polymer including a heat-resistant monomer.

For example, the α-methylstyrene-based copolymer (B) may be a copolymer of an α-methylstyrene-based monomer and a vinyl cyanide compound or a copolymer of an α-methylstyrene-based monomer, a vinyl cyanide compound, and an aromatic vinyl compound excluding α-methylstyrene, preferably a copolymer of α-methylstyrene, acrylonitrile, and styrene.

Specifically, the α-methylstyrene-based copolymer (B) may be a copolymer including 50 to 80% by weight of an α-methylstyrene-based monomer; 20 to 50% by weight of a vinyl cyanide compound; and 0 to 10% by weight or greater than 0% by weight and less than or equal to 10% by weight of an aromatic vinyl compound excluding α-methylstyrene. In this case, heat resistance may be excellent while maintaining impact strength, and thus decomposition by outdoor radiant heat may be prevented, thereby obtaining a deformation prevention effect.

The α-methylstyrene-based copolymer (B) is preferably a copolymer including 50 to 80% by weight of α-methylstyrene; to 50% by weight of acrylonitrile; and 0 to 10% by weight or greater than 0% by weight and less than or equal to 10% by weight of styrene. In this case, heat resistance may be excellent while maintaining impact strength, and thus decomposition by outdoor radiant heat may be prevented, thereby obtaining a deformation prevention effect.

For example, the α-methyl styrene-based monomer may include one or more selected from the group consisting of α-methyl styrene and derivatives thereof. In this case, heat resistance may be excellent. For example, the derivatives of α-methyl styrene may be compounds in which one or more hydrogens of α-methyl styrene are substituted with a substituent such as an alkyl group having 1 to 10 carbon atoms and a halogen group, preferably compounds in which one or more hydrogens in the aromatic ring of α-methyl styrene are substituted with a substituent such as an alkyl group having 1 to 10 carbon atoms and a halogen group.

For example, the α-methylstyrene-based copolymer (B) preferably has a weight average molecular weight of 60,000 to 180,000 g/mol, more preferably 80,000 to 120,000 g/mol. Within this range, heat resistance may be excellent while impact strength is maintained.

In this specification, weight average molecular weight may be measured using tetrahydrofuran (THF) as an eluate through gel permeation chromatography (GPC, Waters Breeze). In this case, weight average molecular weight is obtained as a relative value to a polystyrene standard (PS) specimen. Specific measurement conditions are as follows: solvent: THF, column temperature: 40° C., flow rate: 0.3 ml/min, sample concentration: 20 mg/ml, injection amount: 5 μl, column model: 1×PLgel 10 μm MiniMix-B (250×4.6 mm)+1×PLgel 10 μm MiniMix-B (250×4.6 mm)+1×PLgel 10 μm MiniMix-B Guard (50×4.6 mm), equipment name: Agilent 1200 series system, Refractive index detector: Agilent G1362 RID, RI temperature: 35° C., data processing: Agilent ChemStation S/W, and test method (Mn, Mw and PDI): OECD TG 118.

The α-methylstyrene-based copolymer (B) preferably has a glass transition temperature of 110 to 150° C., more preferably 110 to 140° C. Within this range, heat resistance may be excellent.

In this specification, glass transition temperature may be measured at a temperature rise rate of 10° C./minutes using a Differential Scanning calorimeter (DSC) (Q100, TA Instruments Co.) according to ASTM D 3418.

For example, the α-methylstyrene-based copolymer (B) may be prepared by solution polymerization or bulk polymerization. In this case, heat resistance and impact strength may be excellent.

Solution polymerization and bulk polymerization methods commonly practiced in the art to which the present invention pertains may be used in the present invention without particular limitation.

C) Ultra-High Molecular Weight Copolymer Having Weight Average Molecular Weight of 1,000,000 to 12,000,000 g/Mol For example, based on 100 parts by weight of the base resin, the ultra-high molecular weight copolymer (C) may be included in an amount of 0.5 to 10 parts by weight, preferably 1 to 7 parts by weight, more preferably 1.5 to 5 parts by weight. Within this range, since the thermoplastic resin composition of the present invention has excellent heat resistance and processability while having excellent mechanical properties such as impact strength, tensile strength, flexural strength, and hardness, the thermoplastic resin composition may replace a PVC resin using an existing extruder.

In this specification, ultra-high molecular weight may be defined as a weight average molecular weight of 1,000,000 to 12,000,000 g/mol. Accordingly, an ultra-high molecular weight copolymer having a weight average molecular weight of 1,000,000 to 12,000,000 g/mol has the same meaning as a copolymer having a weight average molecular weight of 1,000,000 to 12,000,000 g/mol.

For example, the ultra-high molecular weight copolymer (C) may be an acrylic-based copolymer (C-1), an aromatic vinyl compound-vinyl cyanide compound copolymer (C-2), or a mixture thereof. In this case, mechanical properties such as impact strength, tensile strength, and flexural strength may be maintained, and flowability may be reduced, thereby improving processability.

For example, the acrylic-based copolymer (C-1) may include an alkyl acrylate-based crosslinked product (i) including a crosslinking agent and 5 to 20% by weight of an alkyl acrylate monomer; 55 to 90% by weight of a methyl methacrylate monomer (ii); and 5 to 40% by weight of one or more (iii) selected from the group consisting of an alkyl acrylate monomer and an alkyl methacrylate monomer. In this case, mechanical properties such as impact strength, tensile strength, and flexural strength may be maintained, and flowability may be reduced, thereby improving processability.

The acrylic-based copolymer (C-1) preferably includes an alkyl acrylate-based crosslinked product (i) including a crosslinking agent and 10 to 17% by weight of an alkyl acrylate monomer; 60 to 80% by weight of a methyl methacrylate monomer (ii); and 10 to 30% by weight of one or more (iii) selected from the group consisting of an alkyl acrylate monomer and an alkyl methacrylate monomer. In this case, mechanical properties such as impact strength, tensile strength, and flexural strength may be maintained, and flowability may be reduced, thereby improving processability.

For example, the crosslinking agent may include one or more selected from the group consisting of allyl methacrylate, trimethylolpropane triacrylate, and divinylbenzene.

For example, based on 100 parts by weight in total of the monomers used to polymerize the acrylic-based copolymer (C-1), the crosslinking agent may be included in an amount of 0.01 to 0.3 parts by weight. Within this range, extensional viscosity may be improved, and processability may be excellent.

For example, the alkyl acrylate-based crosslinked product may have a swelling index of 3 to 10, preferably 4 to 9. Within this range, extensional viscosity may be improved, and processability may be excellent.

In this description, to calculate swelling index, acetone is added to 1 g of alkyl acrylate-based crosslinked product powder, stirring is performed at room temperature for 24 hours, centrifugation is performed to obtain a fraction not dissolved in acetone, and then the fraction is dried. Then, the weights of the fraction before and after drying are measured, and swelling index is calculated by substituting the weight values into the following equation.

Swelling index=Weight before drying after centrifugation/weight after drying after centrifugation For example, the alkyl acrylate monomer may have a linear, branched, or cyclic alkyl group having 1 to 18 carbon atoms, and preferably includes one or more selected from the group consisting of methyl acrylate, ethyl acrylate, n-butyl acrylate, lauryl acrylate, stearyl acrylate, 2-ethylhexyl acrylate, and cyclohexyl acrylate.

For example, the alkyl methacrylate monomer may have a linear or cyclic alkyl group having 2 to 18 carbon atoms, and preferably includes one or more selected from the group consisting of n-butyl methacrylate, lauryl methacrylate, stearyl methacrylate, tridecyl methacrylate i-butyl methacrylate, t-butyl methacrylate, 2-ethylhexylmethacrylate, and cyclohexyl methacrylate.

For example, the acrylic-based copolymer (C-1) may have a weight average molecular weight of 1,000,000 to 12,000,000 g/mol, preferably 1,000,000 to 9,000,000 g/mol, more preferably 1,000,000 to 6,000,000 g/mol. Within this range, mechanical properties may be excellent, and flowability may be improved.

For example, the acrylic-based copolymer (C-1) may be prepared by emulsion polymerization, suspension polymerization, or solution polymerization, preferably emulsion polymerization. In this case, processability and impact strength may be excellent.

Emulsion polymerization, suspension polymerization, and solution polymerization commonly practiced in the art to which the present invention pertains may be used in the present invention without particular limitation.

A method of preparing the acrylic-based copolymer (C-1) preferably includes a step (i) of preparing an alkyl acrylate-based crosslinked product having a swelling index of 3 to 10 using a crosslinking agent and 5 to 20% by weight of an alkyl acrylate-based monomer; a step (ii) of preparing a polymer by emulsion-polymerizing 27.5 to 45% by weight of a methyl methacrylate monomer, 2.5 to 20% by weight of one or more selected from the group consisting of an alkyl acrylate monomer having an alkyl group having 1 to 18 carbon atoms and an alkyl methacrylate monomer having an alkyl group having 2 to 18 carbon atoms, an emulsifier, a crosslinking agent, a polymerization initiator, and a redox catalyst before or after the step (i) of preparing the alkyl acrylate-based crosslinked product; and a step of terminating emulsion polymerization by adding 27.5 to 45% by weight of a methyl methacrylate monomer, 2.5 to 20% by weight of one or more selected from the group consisting of an alkyl acrylate monomer having an alkyl group having 1 to 18 carbon atoms and an alkyl methacrylate monomer having an alkyl group having 2 to 18 carbon atoms, an emulsifier, a crosslinking agent, a polymerization initiator, and a redox catalyst to the alkyl acrylate-based crosslinked product prepared in the step (i) and the polymer prepared in the step (ii). In this case, mechanical properties such as impact strength, tensile strength, and flexural strength may be maintained, and flowability may be reduced, thereby improving processability.

For example, the step (i) and the step (ii) may be performed in a separate place or reactor.

Based on 100 parts by weight in total of the monomers used to polymerize the acrylic-based copolymer (C-1), the emulsifier may be included in an amount of 0.5 to 5 parts by weight.

The types of the emulsifier are not particularly limited. However, the emulsifier may include one or more selected from the group consisting of anionic emulsifiers including aliphatic esters, alkyl benzene sulfonates, alkyl phosphate salts, and dialkyl sulfosuccinates and nonionic emulsifiers including polyoxyethylene alkyl ethers and alkylamine esters.

For example, based on 100 parts by weight in total of the monomers used to polymerize the acrylic-based copolymer (C-1), the crosslinking agent may be included in an amount of 0.01 to 0.3 parts by weight.

For example, the crosslinking agent may include one or more selected from the group consisting of aryl methacrylate, trimethylolpropane triacrylate, and divinylbenzene, preferably an acrylate-based compound.

For example, based on 100 parts by weight in total of the monomers used to polymerize the acrylic-based copolymer (C-1), the polymerization initiator may be included in an amount of 0.0005 to 0.005 parts by weight.

For example, the polymerization initiator may include one or more selected from the group consisting of a water-soluble initiator, a fat-soluble initiator, and a redox initiator.

The water-soluble initiator preferably includes one or more selected from the group consisting of potassium persulfate, ammonium persulfate, and sodium persulfate.

The fat-soluble initiator preferably includes one or more selected from the group consisting of t-butyl hydroperoxide, cumene hydroperoxide, benzoylperoxide, and lauroyl peroxide.

For example, based on 100 parts by weight in total of the monomers used to polymerize the acrylic-based copolymer (C-1), the redox catalyst may be included in an amount of 0.01 to 0.1 parts by weight.

For example, the redox catalyst may include one or more selected from the group consisting of sodium formaldehyde sulfoxylate, disodium ethylenediaminetetraacetate, ferrous sulfate, ethylene sodium diamine tetraacetate, and copper(II) sulfate.

For example, the acrylic-based copolymer copolymer in a latex form prepared by emulsion polymerization may be prepared as an acrylic-based copolymer in a powder form through aggregation, dehydration, and drying steps.

For example, the aromatic vinyl compound-vinyl cyanide compound copolymer (C-2) may include 60 to 80% by weight of an aromatic vinyl compound and 20 to 40% by weight of a vinyl cyanide compound, preferably 65 to 75% by weight of an aromatic vinyl compound and 25 to 35% by weight of a vinyl cyanide compound. Within this range, mechanical properties such as impact strength, tensile strength, and flexural strength may be maintained, and flowability may be reduced, thereby improving processability.

For example, the aromatic vinyl compound-vinyl cyanide compound copolymer (C-2) may have a weight average molecular weight of 1,000,000 to 12,000,000 g/mol, preferably 1,000,000 to 10,000,000 g/mol, more preferably 1,000,000 to 7,000,000 g/mol, still more preferably 1,000,000 to 6,000,000 g/mol, most preferably 1,000,000 to 6,000,000 g/mol. Within this range, processability may be excellent.

The aromatic vinyl compound-vinyl cyanide compound copolymer (C-2) is preferably a styrene-acrylonitrile copolymer. In this case, processability may be excellent.

For example, the aromatic vinyl compound-vinyl cyanide compound copolymer (C-2) may be prepared by emulsion polymerization, bulk polymerization, or suspension polymerization, preferably emulsion polymerization. In this case, heat resistance and fluidity may be excellent.

When the aromatic vinyl compound and the vinyl cyanide compound are emulsion-polymerized, components, such as an emulsifier, a polymerization initiator, a molecular weight regulator, and deionized water, commonly used in emulsion polymerization, may be added. In addition, emulsion polymerization methods commonly practiced in the art to which the present invention pertains may be used in the present invention without particular limitation.

The types of the aromatic vinyl compound and the vinyl cyanide compound included in the aromatic vinyl compound-vinyl cyanide compound copolymer (C-2) may be the same as the types of the aromatic vinyl compound and the vinyl cyanide compound included in the graft copolymer (A-1).

Additives

For example, the thermoplastic resin composition may further include one or more selected from the group consisting of an antioxidant, a UV stabilizer, a fluorescent brightening agent, a chain extender, a release agent, a pigment, a dye, an antibacterial agent, a processing aid, a metal deactivator, a smoke suppressant, an inorganic filler, glass fiber, an anti-friction agent, and an anti-wear agent. For example, based on 100 parts by weight of the base resin, each of the additives may be included in an amount of 0.01 to 5 parts by weight, preferably 0.05 to 3 parts by weight, more preferably 0.1 to 2 parts by weight. In this case, the required physical properties of the thermoplastic resin composition of the present invention may be implemented without deterioration in the intrinsic physical properties thereof.

Thermoplastic Resin Composition

The thermoplastic resin composition preferably has a total rubber content of 25 to 43% by weight, more preferably 27 to 40% by weight, still more preferably 30 to 35% by weight. Within this range, mechanical properties and processability may be excellent.

In the present invention, rubber content is measured using FT-IR.

For example, when an extensional viscosity fixture (EVF) attached to an ARES rheometer of TA Instruments (New Castle, Delaware, USA) is used to preheat a specimen having a size of 180×10×7 mm at 190° C. for 30 seconds and measure extensional viscosity after 1 second, the thermoplastic resin composition may have an extensional viscosity of 530,000 to 760,000 Pa·S, preferably 540,000 to 750,000 Pa·S, more preferably 550,000 to 740,000 Pa·S, still more preferably 570,000 to 730,000 Pa·S, most preferably 600,000 to 720,000 Pa·S. Within this range, processability and physical property balance may be excellent, and extruding may be performed using existing PVC equipment.

In this specification, extensional viscosity refers to the resistance of fluid when the fluid is deformed by extensional stress. As extensional viscosity increases, the flowability of a molten resin decreases, thereby improving extrusion processability.

For example, the thermoplastic resin composition may have an impact strength (23° C., ¼") of 23 kgf·cm/cm or more, preferably 25 kgf·cm/cm or more, more preferably 25 to 42 kgf·cm/cm, still more preferably 27 to 42 kgf·cm/cm as measured according to ASTM D256. Within this range, the balance of all physical properties may be excellent.

For example, the thermoplastic resin composition may have a tensile strength of 230 kgf/cm$^2$ or more, preferably 250 kgf/cm$^2$ or more, more preferably 250 to 400 kgf/cm$^2$, still more preferably 270 to 380 kgf/cm$^2$, most preferably 300 to 370 kgf/cm$^2$ as measured according to ASTM D638. Within this range, the balance of all physical properties may be excellent.

For example, the thermoplastic resin composition may have a flexural strength of 330 kgf/cm$^2$ or more, preferably 350 kgf/cm$^2$ or more, more preferably 350 to 700 kgf/cm$^2$, still more preferably 400 to 680 kgf/cm$^2$, most preferably 430 to 650 kgf/cm$^2$ as measured according to ASTM D790. Within this range, the balance of all physical properties may be excellent.

For example, the thermoplastic resin composition may have a hardness of 38 or more, preferably 40 or more, more preferably 40 to 85, still more preferably 45 to 80, most preferably 50 to 75 as measured according to ASTM D785. Within this range, the balance of all physical properties may be excellent.

For example, the thermoplastic resin composition may have a heat resistance of 67° C. or higher, preferably 70° C. or higher, more preferably 70 to 85° C., still more preferably 75 to 82° C. as measured according to ASTM D648. In this case, the balance of all physical properties may be excellent.

For example, when a 3T sheet is prepared from the thermoplastic resin composition under the conditions of 200° C. and a molding pressure of 100 kgf/cm$^2$ using a T-die extruder, and then the surface of the sheet is observed with the naked eye, the surface of the sheet is uniform, no shrinkage is observed in the surface of the sheet, and the appearance of the sheet is kept constant.

Method of Preparing Thermoplastic Resin Composition

A method of preparing a thermoplastic resin composition according to the present invention includes a step of mixing 100 parts by weight of a base resin including 0.5 to 45% by weight of a graft copolymer (A-1) including acrylate rubber having an average particle diameter of 50 to 150 nm, an aromatic vinyl compound, and a vinyl cyanide compound, 20 to 80% by weight of a graft copolymer (A-2) including acrylate rubber having an average particle diameter of 151 to 600 nm, an aromatic vinyl compound, and a vinyl cyanide compound, and 10 to 45% by weight of an α-methylstyrene-based copolymer (B) having a weight average molecular weight of 60,000 to 180,000 g/mol; and 0.5 to 10 parts by weight of an ultra-high molecular weight copolymer (C) having a weight average molecular weight of 1,000,000 to 12,000,000 g/mol, and then preparing pellets using an extrusion kneader with a size of 10 to 100 pi at 200 to 300° C.

In this case, mechanical properties such as impact strength, tensile strength, flexural strength, and hardness may be excellent. In addition, due to excellent heat resistance and processability, an existing extruder may be used to replace a PVC resin with the thermoplastic resin composition of the present invention.

The method of preparing the thermoplastic resin composition shares all the technical characteristics of the above-described thermoplastic resin composition. Accordingly, repeated description thereof will be omitted.

In the step of preparing pellets using the extrusion kneader, preferably, the extrusion kneader having a size of 25 to 75 pi at 200 to 300° C. More preferably, the extrusion kneader having a size of 30 to 75 pi at 210 to 260° C. Within this range, stable extrusion is possible and kneading effect may be excellent. At this time, the temperature is temperature set in a cylinder, and pi means outer diameter (unit: mm).

Extrusion kneaders commonly used in the art to which the present invention pertains may be used without particular limitation, and a twin-screw extrusion kneader is preferably used.

Molded Article

For example, a molded article of the present invention includes the thermoplastic resin composition of the present invention. In this case, mechanical properties such as impact strength, tensile strength, flexural strength, and hardness may be excellent. In addition, due to excellent heat resistance and processability, an existing extruder may be used to replace a PVC resin with the thermoplastic resin composition of the present invention.

The molded article is preferably an exterior material for construction, specifically, a window frame, a door, a roof, or a fence. In this case, the molded article including the thermoplastic resin composition of the present invention may have quality superior to quality required by the market.

A method of manufacturing the molded article includes a step of mixing 100 parts by weight of a base resin including 0.5 to 45% by weight of a graft copolymer (A-1) including acrylate rubber having an average particle diameter of 50 to 150 nm, an aromatic vinyl compound, and a vinyl cyanide compound, 20 to 80% by weight of a graft copolymer (A-2) including acrylate rubber having an average particle diameter of 151 to 600 nm, an aromatic vinyl compound, and a vinyl cyanide compound, and 10 to 45% by weight of an α-methylstyrene-based copolymer (B) having a weight average molecular weight of 60,000 to 180,000 g/mol; and 0.5 to 10 parts by weight of an ultra-high molecular weight copolymer (C) having a weight average molecular weight of 1,000,000 to 12,000,000 g/mol, and then performing kneading and extrusion at 200 to 300° C. to prepare pellets; and a step of sheet-molding or injection-molding the prepared pellets at a molding temperature of 180 to 300° C. to manufacture a molded article. In this case, a thermoplastic resin product having excellent processability may be prepared.

As a preferred example, the step of manufacturing a molded article may include a step of sheet-molding the prepared pellets at a molding temperature of 180 to 300° C. As a more preferred example, the step of manufacturing a molded article may include a step of sheet-molding the prepared pellets under the conditions of a molding temperature of 180 to 300° C. and a molding pressure of 50 to 300 kgf/cm$^2$. In this case, a sheet-molded article having excellent processability and a uniform surface may be easily manufactured.

The molding temperature is preferably 190 to 230° C., more preferably 200 to 220° C. Within this range, a sheet-molded article having excellent processability and a uniform surface may be easily manufactured.

The molding pressure is preferably 50 to 200 kgf/cm$^2$, more preferably 80 to 150 kgf/cm$^2$. Within this range, a sheet-molded article having high impact strength may be easily manufactured.

As another preferred example, the step of manufacturing a molded article may include a step of injection-molding the prepared pellets under the conditions of an injection temperature of 200 to 260° C., an injection pressure of 60 to 100 bar, and a holding pressure of 25 to 55 bar. In this case, an injection-molded article having excellent mechanical properties such as impact strength may be easily manufactured.

The injection temperature is preferably 200 to 230° C., more preferably 210 to 220° C. Within this range, an injection-molded article having excellent mechanical properties such as impact strength may be easily manufactured.

The injection pressure is preferably 70 to 90 bar, more preferably 75 to 85 bar. Within this range, an injection-molded article having excellent mechanical properties such as impact strength may be easily manufactured.

The holding pressure is preferably 30 to 50 bar, more preferably 35 to 50 bar. Within this range, an injection-molded article having excellent mechanical properties such as impact strength may be easily manufactured.

In describing the thermoplastic resin composition of the present invention, the method of preparing the same, and the molded article including the same, it should be noted that other conditions or equipment not explicitly described herein may be appropriately selected within the range commonly practiced in the art without particular limitation.

Hereinafter, the present invention will be described in more detail with reference to the following preferred examples. However, these examples are provided for illustrative purposes only and should not be construed as limiting the scope and spirit of the present invention. In addition, it will be apparent to those skilled in the art that various changes and modifications may be made without departing from the spirit and scope of the present invention, and such changes and modifications are also within the scope of the appended claims.

Examples

Materials used in Examples and Comparative Examples below are as follows.
- A-1) Graft copolymer: Butylacrylate-styrene-acrylonitrile copolymer (butylacrylate: 50% by weight, styrene: 35% by weight, and acrylonitrile: 15% by weight) containing acrylate rubber having an average particle diameter of 120 nm
- A-2) Graft copolymer: Butylacrylate-styrene-acrylonitrile copolymer (butylacrylate: 50% by weight, styrene: 35% by weight, and acrylonitrile: 15% by weight) containing acrylate rubber having an average particle diameter of 400 nm
- B) α-methylstyrene-based polymer: Heat-resistant SAN resin (α-methylstyrene: 65% by weight, acrylonitrile: 30% by weight, and styrene: 5% by weight, weight average molecular weight: 90,000 g/mol)
- C-1) Ultra-high molecular weight acrylic-based copolymer: Acrylic copolymer (butylacrylate: 15% by weight and methylmethacrylate: 85% by weight) having a weight average molecular weight of 1,000,000 g/mol
- C-2) Ultra-high molecular weight SAN copolymer: Styrene-acrylonitrile copolymer (ZB-869, Zibo Huaxing Additives Co.) having a weight average molecular weight of 5,000,000 g/mol Examples 1 to 11 and Comparative Examples 1 to 9

According to the contents shown in Tables 1 and 2, the components shown in Tables 1 and 2 were introduced into a twin-screw extruder, and kneading and extrusion were performed at a cylinder temperature of 230° C. to prepare pellets. Using the prepared pellets, a 3T sheet was prepared under the conditions of a molding temperature of 200° C. and a molding pressure of 100 kgf/cm$^2$ using a T-die extruder, and then moldability was evaluated. In addition, the prepared pellets were injected at a barrel temperature of 220° C. using an injection machine to prepare a specimen for measuring physical properties, and the impact strength, tensile strength, flexural strength, hardness, heat resistance, and extensional viscosity of the specimen were measured.

Test Example

The properties of the specimens prepared in Examples to 11 and Comparative Examples 1 to 9 were measured according to the following methods, and the results are shown in Tables 1 and 2 below.

Measurement Methods
- Rubber content (% by weight): Rubber content of thermoplastic resin composition pellets was measured using Agilent Cary 660 FT-IR (Agilent Co.).
- Impact strength (kgf·cm/cm): Impact strength was measured under the conditions of a thickness of ¼" and a temperature of 23° C. according to ASTM D256.
- Tensile strength (kgf/cm$^2$): Tensile strength was measured according to ASTM D638.
- Flexural strength (kgf/cm$^2$): Flexural strength was measured according to ASTM D790.
- Hardness: Hardness was measured according to ASTM D785.
- Heat resistance (° C.): Heat resistance was measured under a load of 18.6 kgf according to ASTM D648.
- Extensional viscosity (Pa·S): An extensional viscosity fixture (EVF) attached to an ARES rheometer of TA Instruments was used to preheat a specimen having a size of 180×10×7 mm at 190° C. for 30 seconds and measure extensional viscosity after 1 second.
- Sheet moldability: A 3T sheet was prepared under the conditions of a molding temperature of 200° C. and a molding pressure of 100 kgf/cm$^2$ using a T-die extruder, and then the surface uniformity and appearance (whether shrinkage or deformation has occurred) of the sheet were evaluated by visual observation as follows:
  ○: Excellent surface uniformity and appearance [205]
  Δ: Excellent surface uniformity or appearance
  X: Poor both in surface uniformity and appearance

TABLE 1

| Classification | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|
| A-1) | 15 | 1 | 35 | 15 | 15 | 15 | 15 | 12 | 15 | 15 | 15 |
| A-2) | 50 | 65 | 30 | 70 | 50 | 50 | 50 | 48 | 50 | 50 | 50 |
| B) | 35 | 34 | 35 | 15 | 35 | 35 | 35 | 37 | 35 | 35 | 35 |
| C-1) | 3 | 3 | 3 | 3 | 1 | 5 | 7 | 3 | | | |
| C-2) | | | | | | | | | 1 | 3 | 7 |

TABLE 1-continued

| Classification | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|
| Rubber content | 32.5 | 32.5 | 32.58 | 42.5 | 32.5 | 32.5 | 32.5 | 30 | 32.5 | 32.5 | 32.5 |
| Impact strength | 30 | 35 | 25 | 40 | 30 | 30 | 30 | 28 | 30 | 30 | 30 |
| Tensile strength | 300 | 280 | 350 | 250 | 300 | 300 | 300 | 360 | 300 | 300 | 300 |
| Flexural strength | 450 | 420 | 500 | 350 | 450 | 450 | 450 | 620 | 450 | 450 | 450 |
| Hardness | 65 | 60 | 65 | 40 | 65 | 65 | 65 | 70 | 65 | 65 | 65 |
| Heat resistance | 78 | 80 | 78 | 70 | 78 | 78 | 78 | 80 | 78 | 78 | 78 |
| Extensional viscosity | 670,000 | 620,000 | 550,000 | 660,000 | 630,000 | 680,000 | 700,000 | 640,000 | 640,000 | 680,000 | 720,000 |
| Sheet moldability | ○ | Δ | Δ | Δ | Δ | ○ | ○ | ○ | ○ | ○ | ○ |

TABLE 2

| Classification | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|
| A-1) | 15 | 15 | 15 | 25 | 35 | 0 | 50 | 15 | 15 |
| A-2) | 50 | 50 | 20 | 65 | 57 | 75 | 15 | 50 | 50 |
| B) | 35 | 35 | 65 | 10 | 8 | 25 | 35 | 35 | 35 |
| C-1) | 0.1 | 15 | 3 | 1 | 3 | 3 | 3 | | |
| C-2) | | | | | | | | 0.1 | 15 |
| Rubber content | 32.5 | 32.5 | 17.5 | 45 | 46 | 37.5 | 32.5 | 32.5 | 32.5 |
| Impact strength | 33 | 40 | 15 | 60 | 62 | 35 | 20 | 33 | 40 |
| Tensile strength | 300 | 300 | 470 | 180 | 170 | 220 | 380 | 300 | 300 |
| Flexural strength | 460 | 400 | 800 | 300 | 290 | 350 | 500 | 450 | 450 |
| Hardness | 62 | 65 | 100 | 55 | 55 | 35 | 65 | 62 | 63 |
| Heat resistance | 78 | 78 | 92 | 60 | 62 | 65 | 80 | 78 | 78 |
| Extensional viscosity | 350,000 | 770,000 | 292,000 | 100,000 | 130,000 | 500,000 | 400,000 | 380,000 | 800,000 |
| Sheet moldability | X | X | X | X | X | Δ | Δ | X | X |

In Tables 1 and 2, the content of each of A-1), A-2), and B) is given in % by weight based on the total weight thereof. The content of C) is given in parts by weight based on 100 parts by weight in total of A-1), A-2), and B.

As shown in Tables 1 and 2, compared to Comparative Examples 1 to 9, in the case of Examples 1 to 11 according to the present invention, impact strength, tensile strength, flexural strength, and hardness are maintained, heat resistance and extensional viscosity are excellent, and sheet moldability is improved, allowing extrusion using existing PVC equipment. In particular, in the case of Examples 1 and 6 to 11, in addition to extensional viscosity, mechanical strength, and heat resistance, sheet moldability is excellent.

Specifically, in the case of Comparative Example 1 including the ultra-high molecular weight acrylic-based copolymer (C-1) in an amount less than the range of the present invention, extensional viscosity is low, and sheet moldability is poor. In the case of Comparative Example 2 including an excess of the acrylic-based copolymer (C-1), extensional viscosity is greatly increased, resulting in poor sheet moldability.

In addition, in the case of Comparative Example 3 in which an excess of the copolymer (B) is included and the total rubber content of a thermoplastic resin composition is small, impact strength and extensional viscosity are reduced, and sheet moldability is poor. In the case of Comparative Examples 4 and 5 in which a small amount of the copolymer (B) is included and the total rubber content of a thermoplastic resin composition is excessive, heat resistance and extensional viscosity are reduced, and sheet moldability is poor.

In addition, in the case of Comparative Example 6 not including the resin (A-1), heat resistance is reduced. In the case of Comparative Example 7 in which the contents of the resin (A-1) and the resin (A-2) are out of the range of the present invention, extensional viscosity and impact strength are significantly reduced.

In addition, in the case of Comparative Example 8 including the ultra-high molecular weight SAN-based resin (C-2) in an amount less than the range of the present invention, extensional viscosity is greatly reduced, resulting in poor sheet moldability. In the case of Comparative Example 9 including the ultra-high molecular weight SAN-based resin (C-2) in an amount exceeding the range of the present invention, extensional viscosity is greatly increased, resulting in poor sheet moldability.

As a result, in the case of the thermoplastic resin composition of the present invention including 100 parts by weight of a base resin including a graft copolymer including acrylate rubber having an average particle diameter of 50 to 150 nm, an aromatic vinyl compound, and a vinyl cyanide compound; a graft copolymer including acrylate rubber having an average particle diameter of 151 to 600 nm, an aromatic vinyl compound, and a vinyl cyanide compound; and an α-methylstyrene-based copolymer having a weight average molecular weight of 60,000 to 180,000 g/mol and an ultra-high molecular weight copolymer having a weight average molecular weight of 1,000,000 to 12,000,000 g/mol in a predetermined amount, mechanical properties are maintained, heat resistance and extensional viscosity are excellent, and sheet moldability is improved, enabling replacement of a PVC resin using existing equipment.

The invention claimed is:

1. A thermoplastic resin composition, comprising:
   100 parts by weight of a base resin comprising
      0.5 to 45% by weight of a graft copolymer (A-1) comprising
         acrylate rubber having an average particle diameter of from 50 to 150 nm,
         an aromatic vinyl compound, and
         a vinyl cyanide compound,
      20 to 80% by weight of a graft copolymer (A-2) comprising
         acrylate rubber having an average particle diameter of from 151 to 600 nm,
         an aromatic vinyl compound, and
         a vinyl cyanide compound, and
      15 to 45% by weight of an α-methylstyrene-based copolymer (B) having a weight average molecular weight of from 60,000 to 180,000 g/mol; and
   0.5 to 10 parts by weight of an ultra-high molecular weight copolymer (C) having a weight average molecular weight of from 1,000,000 to 12,000,000 g/mol,
   wherein a weight ratio of the graft copolymer (A-1) to the graft copolymer (A-2) is 1:3.3 to 1:5.

2. The thermoplastic resin composition according to claim 1, wherein the graft copolymer (A-1) and the graft copolymer (A-2) independently comprise
   40 to 60% by weight of acrylate rubber,
   25 to 45% by weight of an aromatic vinyl compound, and
   5 to 25% by weight of a vinyl cyanide compound.

3. The thermoplastic resin composition according to claim 1, wherein the α-methylstyrene-based polymer (B) comprises
   50 to 80% by weight of an α-methylstyrene-based compound,
   20 to 50% by weight of a vinyl cyanide compound, and
   0 to 10% by weight of an aromatic vinyl compound excluding α-methylstyrene.

4. The thermoplastic resin composition according to claim 1, wherein the ultra-high molecular weight copolymer (C) is an acrylic-based copolymer (C-1), an aromatic vinyl compound-vinyl cyanide compound copolymer (C-2), or a mixture thereof.

5. The thermoplastic resin composition according to claim 4, wherein the acrylic-based copolymer (C-1) comprises
   an alkyl acrylate-based crosslinked product (i) comprising
      a crosslinking agent and
      5 to 20% by weight of an alkyl acrylate monomer,
   55 to 90% by weight of a methyl methacrylate monomer (ii); and
   5 to 40% by weight of one or more (iii) selected from the group consisting of an alkyl acrylate monomer and an alkyl methacrylate monomer.

6. The thermoplastic resin composition according to claim 5, wherein the crosslinking agent comprises one or more selected from the group consisting of allyl methacrylate, trimethylolpropane triacrylate, and divinylbenzene.

7. The thermoplastic resin composition according to claim 5, wherein, based on 100 parts by weight in total of the monomers used to form the acrylic-based copolymer (C-1), the crosslinking agent is present in an amount of from 0.01 to 0.3 parts by weight.

8. The thermoplastic resin composition according to claim 1, wherein the thermoplastic resin composition has a total rubber content of from 23 to 43% by weight as measured by FT-IR.

9. The thermoplastic resin composition according to claim 1, wherein, the thermoplastic resin composition has an extensional viscosity of from 530,000 to 760,000 Pa's as measured by a method including preheating a specimen having a size of 180×10×7 mm at 190° C. for 30 seconds with an extensional viscosity fixture (EVF) attached to an Advanced Rheometric Expansion System (ARES) rheometer and measuring the extensional viscosity after 1 second.

10. The thermoplastic resin composition according to claim 1, wherein the thermoplastic resin composition has an impact strength (23° C., ¼") of 23 kgf cm/cm or more as measured according to ASTM D256.

11. The thermoplastic resin composition according to claim 1, wherein the thermoplastic resin composition has a tensile strength of 230 kgf/cm$^2$ or more as measured according to ASTM D638.

12. The thermoplastic resin composition according to claim 1, wherein the thermoplastic resin composition has a flexural strength of 330 kgf/cm$^2$ or more as measured according to ASTM D790.

13. The thermoplastic resin composition according to claim 1, wherein the thermoplastic resin composition has a heat resistance of 67° C. or higher as measured under a load of 18.6 kgf/cm$^2$ according to ASTM D648.

14. A method of preparing a thermoplastic resin composition, comprising:
   mixing 100 parts by weight of a base resin comprising
      0.5 to 45% by weight of a graft copolymer (A-1) comprising
         acrylate rubber having an average particle diameter of from 50 to 150 nm,
         an aromatic vinyl compound, and
         a vinyl cyanide compound,
      20 to 80% by weight of a graft copolymer (A-2) comprising
         acrylate rubber having an average particle diameter of from 151 to 600 nm,
         an aromatic vinyl compound, and
         a vinyl cyanide compound, and
      15 to 45% by weight of an α-methylstyrene-based copolymer (B) having a weight average molecular weight of from 60,000 to 180,000 g/mol; and
   0.5 to 10 parts by weight of an ultra-high molecular weight copolymer (C) having a weight average molecular weight of from 1,000,000 to 12,000,000 g/mol, and then
   preparing pellets using an extrusion kneader with a size of from 10 to 100 pi at from 200 to 300° C.
   wherein a weight ratio of the graft copolymer (A-1) to the graft copolymer (A-2) is 1:3.3 to 1:5, and
   wherein pi is a nozzle diameter of the extrusion kneader in mm.

15. A molded article, comprising the thermoplastic resin composition according to claim 1.

* * * * *